(12) United States Patent
Medower et al.

(10) Patent No.: US 7,777,895 B2
(45) Date of Patent: *Aug. 17, 2010

(54) LINEAR-CARRIER PHASE-MASK INTERFEROMETER

(75) Inventors: Brian S. Medower, Tucson, AZ (US); James E. Millerd, Tucson, AZ (US)

(73) Assignee: 4D Technology Corporation, Tucson, AZ (US)

( * ) Notice: Subject to any disclaimer, the term of this patent is extended or adjusted under 35 U.S.C. 154(b) by 481 days.

This patent is subject to a terminal disclaimer.

(21) Appl. No.: 11/800,840

(22) Filed: May 8, 2007

(65) Prior Publication Data

US 2007/0211256 A1  Sep. 13, 2007

Related U.S. Application Data

(63) Continuation-in-part of application No. 10/838,694, filed on May 4, 2004, now Pat. No. 7,230,717.

(51) Int. Cl.
*G01B 11/02* (2006.01)
(52) U.S. Cl. ...................................... 356/521; 356/495
(58) Field of Classification Search ................ 356/489, 356/495, 511–515, 521
See application file for complete search history.

(56) References Cited

U.S. PATENT DOCUMENTS

| 5,943,133 | A | 8/1999 | Zeylikovich |
| 6,304,330 | B1 | 10/2001 | Millerd et al. |
| 6,738,114 | B1 | 5/2004 | Faris et al. |
| 7,057,737 | B2* | 6/2006 | Millerd et al. ............... 356/495 |
| 7,230,717 | B2* | 6/2007 | Brock et al. ................. 356/495 |

* cited by examiner

*Primary Examiner*—Patrick J Connolly
(74) *Attorney, Agent, or Firm*—Antonio R. Durando

(57) ABSTRACT

A phase-difference sensor measures the spatially resolved difference in phase between orthogonally polarized reference and test wavefronts. The sensor is constructed as a linear-carrier phase-mask aligned to and imaged on a linear-carrier detector array. Each adjacent element of the phase-mask measures a predetermined relative phase shift between the orthogonally polarized reference and test beams. Thus, multiple phase-shifted interferograms can be synthesized at the same time by combining pixels with identical phase-shifts. The multiple phase-shifted interferograms can be combined to calculate standard parameters such as modulation index or average phase step. Any configuration of interferometer that produces orthogonally polarized reference and object beams may be combined with the phase-difference sensor of the invention to provide single-shot, simultaneous phase-shifting measurements.

31 Claims, 12 Drawing Sheets

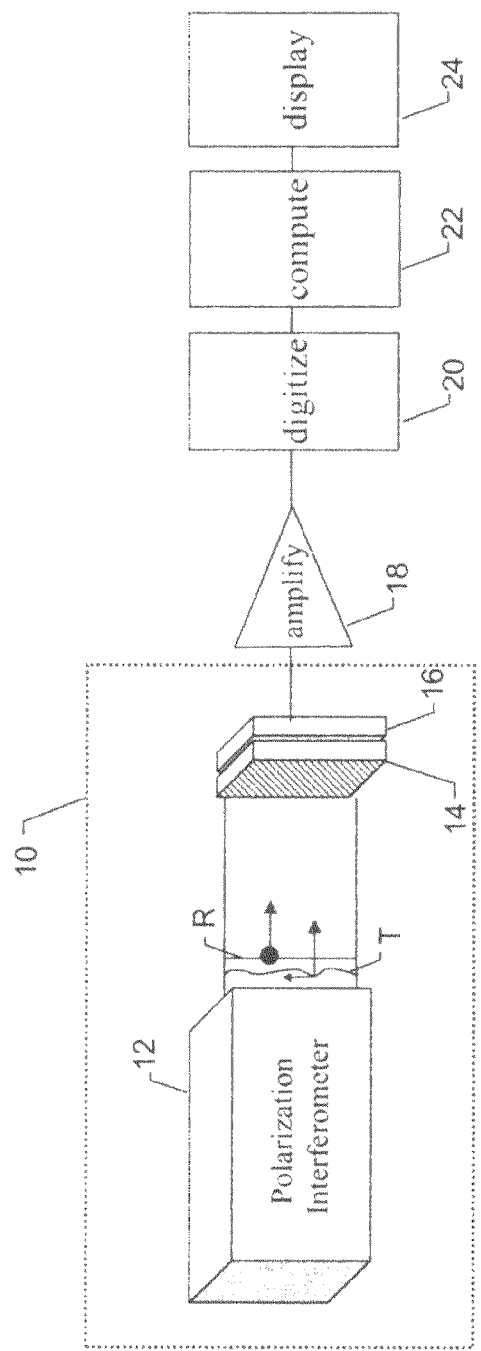
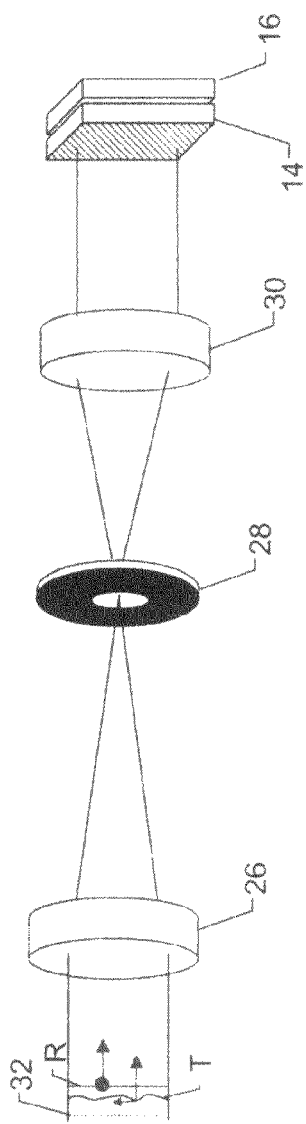
FIG 1
FIG 2

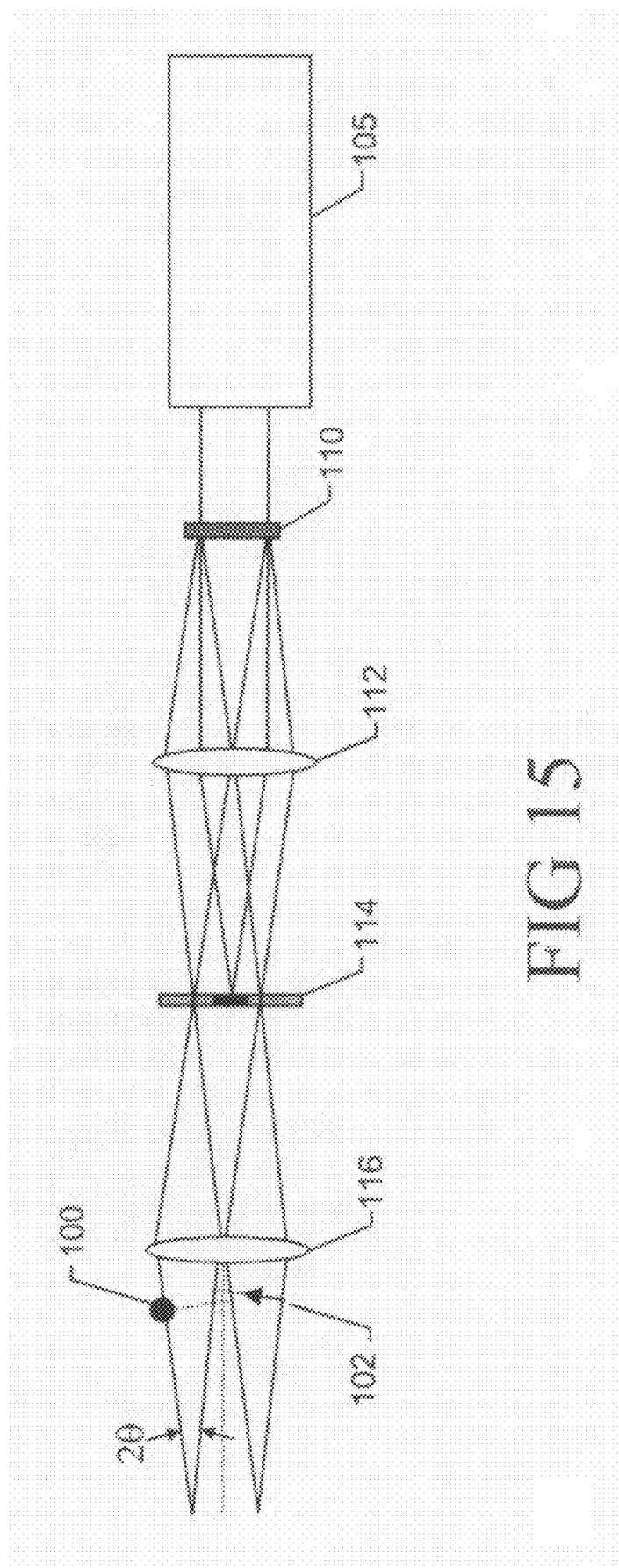

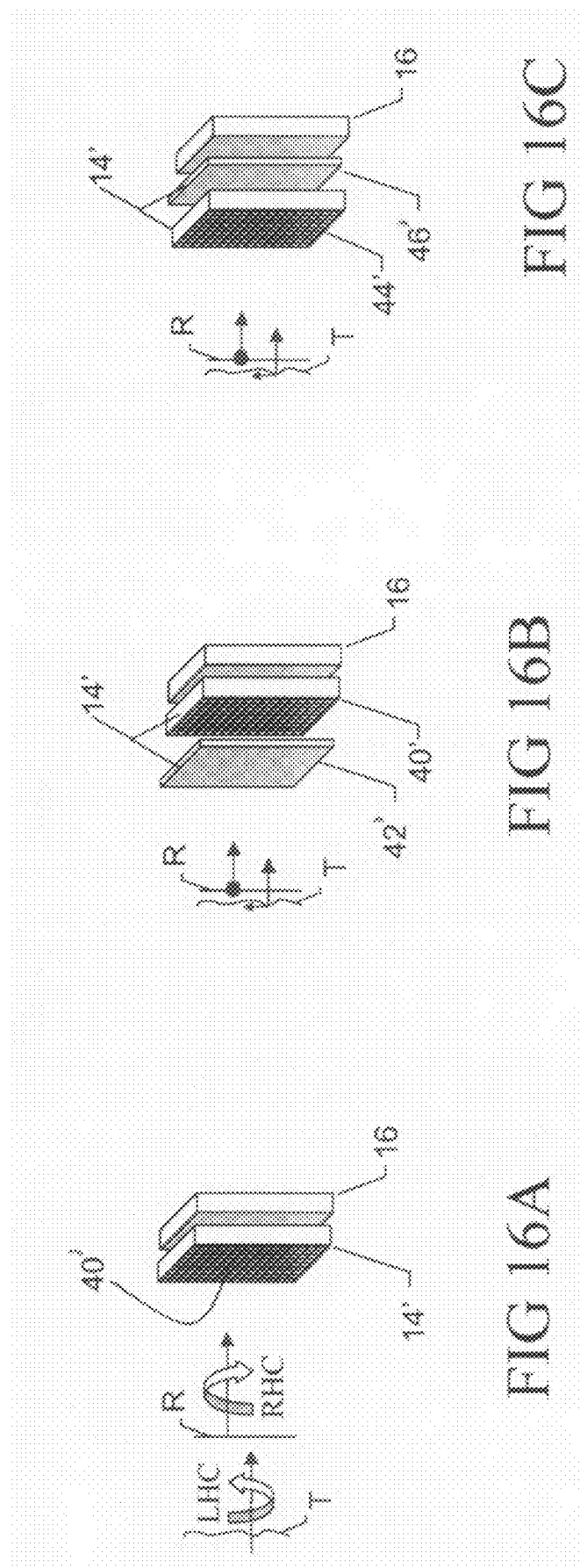

LINEAR-CARRIER PHASE-MASK INTERFEROMETER

RELATED APPLICATIONS

This application is a continuation-in-part application of Ser. No. 10/838,694, filed May 4, 2004, which was based on U.S. provisional Application Ser. No. 60/498,522, filed Aug. 28, 2003, and Ser. No. 60/523,778, filed Nov. 20, 2003, and was a Continuation-in-Part Application of Ser. No. 10/652,903, filed Aug. 29, 2003.

BACKGROUND OF THE INVENTION

1. Field of the Invention

The present invention relates to interferometry. More particularly, the invention relates to methods and apparatus for rapid measurement of the optical phase-difference between two wavefronts. The invention may be implemented in optical systems that measure various parameters of test objects by generating test and reference waves having orthogonal polarizations.

2. Description of the Related Art

Phase-shift interferometry is an established method for measuring a variety of physical parameters ranging from the density of gases to the displacement of solid objects. An interferometric wavefront sensor employing phase-shift interferometry typically consists of a light source that is split into two wavefronts, a reference and a test wavefront, that are later recombined after traveling different path lengths. The relative phase difference between the two wavefronts is manifested as a two-dimensional intensity pattern known as an interferogram. Phase-shift interferometers typically have an element in the path of the reference or the test wavefront to introduce three or more known phase steps or phase shifts. By detecting the intensity pattern with a detector at each of the phase shifts, the phase distribution of the object wavefront can be calculated quantitatively and rapidly independently of the relative energy in the reference or object wavefronts.

Phase shifting of a light beam can either be accomplished by sequentially introducing a phase step (temporal phase shifting) or by splitting the beam into parallel channels for simultaneous phase steps (spatial phase shifting). Spatial phase shifting achieves data acquisition in a time several orders of magnitude smaller than temporal phase shifting, thus offering significant immunity to vibration.

Several methods of spatial phase shifting have been disclosed in the prior art. Smythe and Moore (1983) described a spatial phase-shifting method where conventional beam splitters and polarization optics are used to produce three or four phase-shifted images onto as many cameras for simultaneous detection. Several U.S. Patents [U.S. Pat. No. 4,575,248 (1986), U.S. Pat. No. 4,624,569 (1986), U.S. Pat. No. 5,589,938 (1996), U.S. Pat. No. 5,663,793 (1997), U.S. Pat. No. 5,777,741 (1998), and U.S. Pat. No. 5,883,717 (1999)] later disclosed variations of this approach wherein multiple cameras are used to detect multiple interferograms. These methods all require relatively complex optical and electronic arrangements.

Several publications describe methods that employ diffractive elements to simultaneously image three or more interferograms onto a single sensor. [See, for example, B. Barrientos et. al., "Transient Deformation Measurement with ESPI Using a Diffractive Optical Element for Spatial Phase-stepping," Fringe, Akademie Verlag (1997): 317-8; A. Hettwer, "Three Channel Phase-Shifting Interferometer Using Polarization-Optics and a Diffraction Grating," Optical Engineering, pp. 960, Vol. 39 No. 4, April 2000; and U.S. Pat. No. 4,624,569 (1986), U.S. Pat. No. 6,304,330 (2001) and U.S. Pat. No. 6,522,808 (2003).] While these methods are more compact and less expensive than multi-camera arrangements, they operate only over a limited wavelength range due to dispersion and chromatic distortion inherent in their design. Thus, they are not capable of working with white light or short coherence-length source interferometers. The Mireau interferometer configuration is particularly difficult to implement using the techniques of the prior-art [such as disclosed in U.S. Pat. No. 5,166,751 and U.S. Pat. No. 5,953,124, and in Ngoi, B. K. A., Venkatakrishnan, K., and Sivakumar, N. R., "Phase-shifting Interferometery Immune to Vibration," Applied Optics, Vol. 40, No. 19, P. 3211 (2001)]

Spatial phase shifting has also been accomplished using a tilted reference wave to induce a spatial carrier frequency to the pattern. See, for example, U.S. Pat. No. 5,155,363 (1992) and U.S. Pat. No. 5,361,312 (1994). The spatial carrier method inherently requires a path-length difference of many hundreds of waves between the test and reference wavefronts, thereby precluding the use of white light. In addition, interferometers employing this arrangement must utilize high precision optics to avoid introducing aberrations between the two non-common path beams. U.S. Pat. No. 4,872,755 (1989) teaches the use of a short coherence-length source in combination with a Fizeau-type interferometer to effect instantaneous phase measurement with either the four camera arrangement of Symthe et. al. or a tilted carrier wave.

The prior art also describes the fabrication of micropolarizer arrays where each element has a different polarizer orientation in a repeating pattern. In particular, U.S. Pat. No. 5,327,285 and U.S. Pat. No. 6,384,971 describe the fabrication of micropolarizer arrays using multiple film layers for use in stereoscopic viewing. Nordin et al. describe the use of micropolarizer arrays made from fine conducting wire arrays for imaging polarimetry in the near infrared spectrum ("Micropolarizer Array for Infrared Imaging Polarimetry," J. Opt. Soc. Am A, Vol. 16, No. 5, 1999). Recently, the use of wire grid arrays has also been demonstrated in the visible region of the spectrum (see U.S. Pat. No. 6,108,131, U.S. Pat. No. 6,122,103, U.S. Pat. No. 6,208,463 and U.S. Pat. No. 6,243,199). The planar nature of the conducting strip structure permits using it as a polarizer over an extremely wide incident angle, including zero degrees, and over a broad range of wavelengths, provided the period remains much less than the wavelength. Other investigators (J. Gou et. al., "Fabrication of Thin-Film Micropolarizer Arrays for Visible Imaging Polarimetry," Applied Optics, Vol. 39, No. 10, 2000) also describe the use of patterned multi-level organic thin films for imaging polarimetry in the visible spectral range.

This disclosure describes how a linear-carrier phase-mask can be used as an interferometer to measure optical path-length differences at high-speed, with a single detector array and over a broad wavelength range.

SUMMARY OF THE INVENTION

This invention provides novel arrangements for performing quantitative, instantaneous measurement of optical path-length differences. The method and apparatus of the invention consist of a phase-difference sensor that quantitatively measures the spatially resolved difference in phase between orthogonally polarized reference and test wavefronts. In accordance with the invention, the phase-difference sensor is combined with a variety of polarization interferometers to measure quantities such as surface height, refractive index, gas density, optical wavefront, and/or surface strain.

The phase-difference sensor of the invention is implemented as a linear-carrier phase-mask (LCPM) that is aligned to and/or imaged on a pixelated detector array. The LCPM is preferably configured in an array of linear regions such that each adjacent region of the array produces a predetermined relative phase-shift between orthogonally polarized reference and test wavefronts. In one embodiment of the invention, the LCPM is disposed directly in contact, or nearly in contact, with the detector array such that it is substantially coincident with the image plane of the optical system. In another embodiment, the LCPM is imaged, via relay optics, onto the detector array. An aperture stop in the optical configuration is employed to limit the input acceptance angle of the incident light and ensure that the slope of the phase difference between the reference and test wavefronts does not exceed predetermined measurement limits.

According to one aspect of the invention, multiple phase-shifted interferograms can be synthesized at the same time by combining pixels with identical phase-shifts. Any of the resulting interferograms can be viewed for alignment of the test setup. The multiple phase-shifted interferograms can be combined to calculate standard parameters such as modulation index or average phase step. The primary measurand, the phase difference, can be calculated by using a standard N-bucket algorithm. In an alternative embodiment, a convolution-type algorithm is employed to calculate the phase at any pixel based on the intensity values at the surrounding pixels. The size of the convolution kernel can be controlled to adjust the tradeoff between spatial resolution and accuracy.

Any configuration of interferometer that produces orthogonally polarized reference and object beams may be combined with the phase-difference sensor of the invention to provide single-shot, simultaneous phase-shifting measurements. This enables measurement of a broad range of physical quantities such as surface height, refractive index gradients, gas density, and/or surface strain. Embodiments of the invention include the use of a Twyman-Green type of interferometer, a Mireau-type interferometer, and a Fizeau-type interferometer. The Fizeau-type interferometer includes a short coherence-length source and a path-length delay arm for producing selectively coherent, orthogonally polarized beams from the test and reference surfaces, respectively.

The LCPM can be constructed using several techniques that combine standard semiconductor photolithography with thin-film polarizer manufacturing techniques. In one embodiment the LCPM is constructed as an array of finely conducting metal strips that are patterned and oriented on one side of a planar substrate. The LCPM can be used directly with a polarization interferometer having orthogonal circular polarizations for the reference and test beams, respectively. For use with linearly polarized reference and test beams, the LCPM further includes quarter-wave retardation plates, preferably achromatic or broadband zero-order type, bonded to the front side of the LCPM substrate.

The method and apparatus for providing an improved strain sensor involve the combination of the phase-difference sensor of the invention with a polarization interferometer where the test surface is a diffuse reflector. The method involves measuring a first relative phase-difference at an arbitrary reference state of the test surface, measuring a second relative phase-difference at a subsequent time and state of the test surface, and subtracting the two relative phase measurements to determine the change in surface strain in the object that occurred between the two measurements.

The method and apparatus for providing an improved wavefront sensor involve combining the phase-difference sensor with a polarization point-diffraction interferometer, where the polarization point-diffraction interferometer accepts an input wavefront, generates a test beam that is a copy of the input wavefront, and generates a perfect, unaberrated reference wavefront, the test and reference wavefronts having orthogonal polarizations. This approach further comprises measuring the relative phase between the reference and test wavefronts with the phase-difference sensor.

The method and apparatus for providing an improved two-wavelength interferometer consist of combining the phase-difference sensor of the invention with a tunable laser or with multiple laser sources, measuring the relative phase-difference at each of several wavelengths, and subtracting the relative phase values to determine the contour of an object.

The method and apparatus for providing an improved scanning white-light interferometer are based on combining the phase-difference sensor with a broad-band or white-light source, measuring the phase-shifted interference patterns at a plurality of relative path-length delays between the test surface and the reference surface, the path-length delays totaling a distance much greater than the coherence length of the source, and assembling a high-resolution profile of the surface from the measurements so acquired.

The present invention accomplishes simultaneous phase-shifting with a single pixelated detector, while avoiding the complexity and chromatic dispersion that accompanies the prior-art approach of splitting the wavefront into sub-images with diffractive optical elements. The invention provides an improved method and apparatus for performing two-wavelength interferometry by increasing the range of operational wavelengths, eliminating the need to calibrate dispersion-related pixel matching, and reducing the complexity of the optical arrangement.

The invention also provides an improvement over prior-art methods employing a tilted reference wave because the reference and test beams can be maintained in a true common-path arrangement throughout the entire imaging region of the interferometer. Therefore, it is not necessary to use high quality optics to preserve wavefront quality and, additionally, broadband or white-light sources can be utilized.

Finally, the invention represents an improvement over the pixelated phase mask described in Ser. No. 10/838,694, herein incorporated by reference, because of its relative ease of manufacture (due to the linear, rather than interdispersed, arrangement of the mask elements) and its relative ease of alignment with the detector array (requiring only rotational and y alignment, rather than rotational and x,y alignment). Other objects, features and advantages of the invention will become apparent to those skilled in the art from a consideration of the following detailed description taken in conjunction with the accompanying drawings and claims.

BRIEF DESCRIPTION OF THE DRAWINGS

FIG. 1 is a schematic perspective view of a measurement apparatus configured in accordance with the present invention, particularly illustrating the measurement apparatus with functional blocks.

FIG. 2 is a schematic perspective view of an exemplary embodiment of the invention for quantitative measurement of optical path difference.

FIG. 15 is a schematic view of an illumination source suitable for producing the orthogonally polarized beams of FIG. 14.

FIG. 16A is a schematic perspective view of a pixelated phase-mask described in Ser. No. 10/838,694 for processing reference and test beams with orthogonal circular polarization.

FIG. 16B is a schematic perspective view of another embodiment of pixelated phase-mask suitable for processing reference and test beams with orthogonal linear polarization.

FIG. 16C is a schematic perspective view of yet another pixelated phase-mask suitable for processing reference and test beams with orthogonal linear polarization.

DETAILED DESCRIPTION OF THE INVENTION

Figure 3:
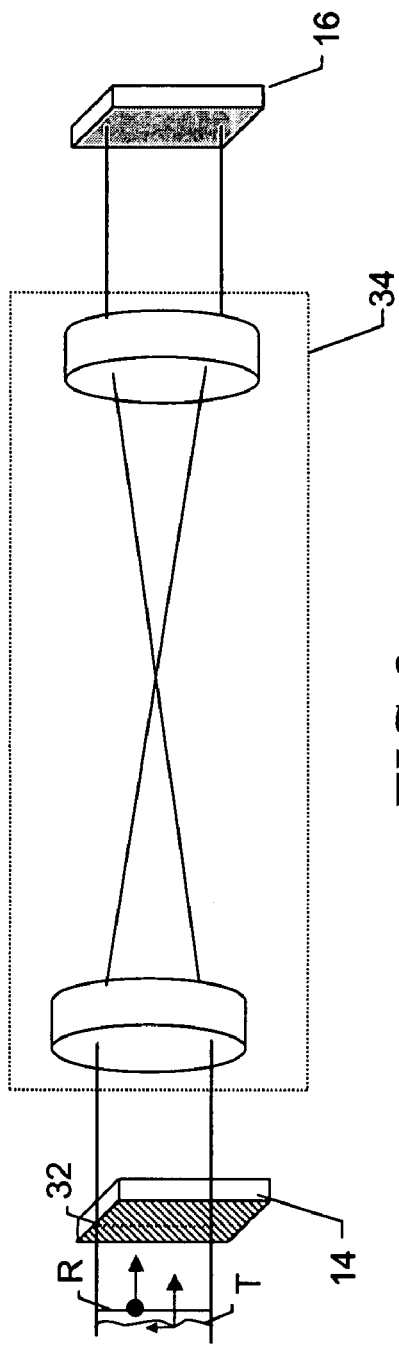
FIG. 3 is a schematic perspective view of an alternative exemplary embodiment of the invention for quantitative measurement of optical path difference, in particular illustrating the use of relay optics between the phase mask and the detector.

The invention consists of a pixelated detector combined with a linear-carrier phase-mask that is subdivided into a plurality of sets of phase-shifting elements, such that each set produces a predetermined phase shift between orthogonally polarized test and reference beams. Thus, each set of phase-shifting elements provides a spatially separated intensity pattern (interferogram) on corresponding pixels of the detector. By providing at least three such sets of elements in the phase-mask, each associated with a different phase shift, sufficient interferograms are produced to characterize a sample surface using conventional interferometric algorithms. For best results, the linear-carrier phase-mask is preferably distributed uniformly across the detector and aligned so that each row of pixels of the detector corresponding to one set of phase-mask elements is surrounded by adjacent rows of pixels corresponding to other sets of phase-mask elements. Similarly, for best resolution, a one-to-one correspondence is preferably used between the width of the linear-carrier phase-mask elements and the effective pitch of the detector pixels.

Thus, various parameters of test objects may be measured by simultaneously generating multiple phase-shifted interferograms on a single sensor array. As disclosed below, the invention may implemented in various configurations to measure optical phase-difference between a reference and a test wavefront in real time; to perform profilometry of an object (that is, to measure the absolute three-dimensional profile of a solid object) with a dynamic range of sub-angstrom to centimeters; to measure the displacement (e.g., thermal strain or vibration) of an object; to measure the wavefront quality of light sources, such as in optical data-storage pickup/transmit assemblies; and to measure flow parameters in a multiphase environment. Examples of such flow parameters include the concentration of selected gaseous species, temperature distributions, particle and droplet size distributions, density, and so on.

Turning to the drawings, wherein like parts are designated throughout with like numerals and symbols, FIG. 1 illustrates schematically a complete measurement system 10 according to the invention. The system consists of a polarization interferometer 12 that generates a reference wavefront R and a test wavefront T having orthogonal polarization states (which can be linear as well as circular) with respect to each other; a linear-carrier phase mask (LCPM) 14 that introduces an effective phase-delay between the reference and test wavefronts at each element and subsequently interferes the transmitted light; and a detector array 16 that converts the optical intensity sensed at each pixel to an electrical charge. The measurement system 10 may also include an amplifier 18 that converts the electrical charge to a voltage, a digitization circuit 20 that converts the voltage to a digital bit stream, a computer 22 that processes the digital bit stream to calculate optical phase difference, and a display 24 that conveys the result in visible form and may permit user interaction in conventional manner.

The LCPM 14 is preferably configured to have an effective pitch or spacing between elements that is identical to, or an integer multiple of, the pixel pitch of the detector array 16, as measured normal to the axis of the stripes of the LCPM (see the figure). Additionally, the LCPM 14 is rotationally and axially aligned with respect to the detector array 16 so that only a single region of the linear-carrier phase-mask is substantially coincident with each pixel of the detector array. A "region" of the LCPM is intended to refer to a set of elements in the phase-mask producing the same phase shift. Accordingly, a region includes separate linear strips of elements, extending over one dimension of the phase-mask, that are adjacent to strips belonging to other regions of the phase-mask. As used herein, the term "linear" is intended to cover a straight as well as a curvilinear strip of contiguous phase-mask elements.

The LCPM 14 and the detector array 16 may be located in substantially the same image plane, or positioned in conjugate image planes. For the purpose of this disclosure, "same image plane" is defined as separated by less than the depth of image focus, including the so-called Talbot image planes. FIG. 1 shows an exemplary embodiment of the invention wherein the LCPM 14 and the detector array 16 are located substantially at the same image plane. The LCPM can be directly deposited over or affixed onto the detector array 16 or can be mechanically registered and separated by a small gap.

FIG. 2 illustrates an imaging system comprising an input lens 26, an aperture 28, and an exit lens 30, that may be used to relay the reference wavefront R and the test wavefront T onto the LCPM 14 and the detector array 16. The focal length of the lenses and the spacing between lenses are adjusted properly to form an image of the input pupil plane 32 at the location of the LCPM 14. The aperture 28 is preferably selected so that the diffraction-limited spot size at the LCPM is approximately 2 effective pixels in diameter in order to avoid aliasing of the interference pattern spatial frequency. This selection of the aperture 28 ensures that spatial frequencies higher than the pixel spacing are not present in the final interference pattern.

An alternative embodiment is shown in FIG. 3, wherein the LCPM 14 is positioned at the input pupil plane 32 and relay optics 34 are used to re-image the light transmitted through the LCPM onto the detector array 16. One advantage of this embodiment is the ability to scale the "effective size of each region" of the LCPM 14 as desired relative to the detector array 16 by introducing magnification in the relay optics 34. Thus, the physical pitch of the LCPM 14 (the spacing between adjacent strips of equal elements) and the detector array 16 (the spacing between adjacent rows of pixels) do not need to be equal. In addition, the LCPM 14 and the detector array 16 can be located in conjugate image planes to within an arbitrarily high degree of precision.

The effective phase-shift of each element of the LCPM 14 can have any spatial distribution; however, it is highly desirable to have a regularly repeating pattern. A preferred embodiment for the LCPM is based on an arrangement wherein the elements of neighboring regions are in quadrature with respect to each other; that is, there is a ninety-degree relative phase shift between neighboring regions. Many algorithms exist in the art for calculating phase from sampled data in quadrature [see for example, Interferogram Analysis for Optical Testing, Malacara et. al., Marcel Decker, Inc. New York, 1998].

The linear-carrier phase mask 14 may be implemented in various ways. For example, FIG. 4A illustrates an embodiment wherein the input polarization of the reference and test wavefronts is left-hand and right-hand circular, respectively. In the case of circular input polarization, the LCPM 14 can be constructed from an array 40 of oriented polarizers, such as taught by Kothiyal and Delisle. They showed that the intensity of two beams having orthogonal circular polarization (i.e., right-hand circular and left-hand circular) that are interfered by a polarizer is given by $$I(x, y) = \frac{1}{2}\left(I_r + I_s + 2\sqrt{I_r I_s} \cos(\Delta\phi(x, y) + 2\alpha_P)\right), \quad (1)$$

where $\alpha_p$ is the angle of the polarizer with respect to the x, y plane. (See "Shearing Interferometer for Phase Shifting Interferometry with Polarization Phase Shifter," Applied Optics Vol. 24, No. 24, pp. 4439-4442, 1985.)

From this relation it can be seen that a polarizer oriented at zero degrees causes interference between the in-phase (i.e., 0°) components of the incident reference and test wavefronts R and T. A polarizer oriented at 45 degrees interferes the in-phase quadrature (i.e., 90°) component between the incident reference and test wavefronts R and T. A polarizer oriented at 90 degrees interferes the out-of-phase (i.e., 180°) component between the incident reference and object wavefronts R and T. Finally, a polarizer oriented at 135 degrees interferes the out-of-phase quadrature (i.e., 270°) component between the incident reference and test wavefronts R and T.

If the input polarization is linear, a quarter waveplate, oriented with the fast axis at 45 degrees with respect to the reference wavefront polarization axis, can be used to convert the wavefronts to opposite circular polarizations. FIG. 4B illustrates the use of a quarter-wave retarder 42 in combination with the oriented polarizer array 40 of FIG. 4A. For convenience, the quarter-wave retarder 42 may be adjoined to the oriented polarizer array 40 to form the LCPM 14; however, the two elements do not need to be in contact and could be separated by a substantial distance or separated by other imaging optics.

Helen et al. (see "Achromatic Phase-Shifting by a Rotating Polarizer," Optics Communications 154, pp. 249-254, 1998) demonstrated that by combining conventional half-wave and quarter-wave plates in series an effective quarter-wave plate may be constructed that works over a broad wavelength range. Thus, the quarter-wave retarder 42 may be constructed by abutting several conventional half-wave and quarter-wave retardation plates in combination. This permits operation over a broad range of wavelengths or with a single broadband source.

Figure 4C:
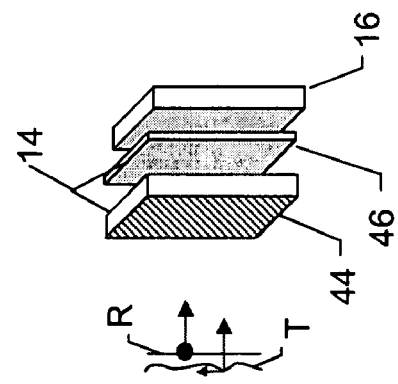
FIG. 4C is a schematic perspective view of yet another linear-carrier phase-mask according to the invention suitable for processing reference and test beams with orthogonal linear polarization.
Figure 4B:
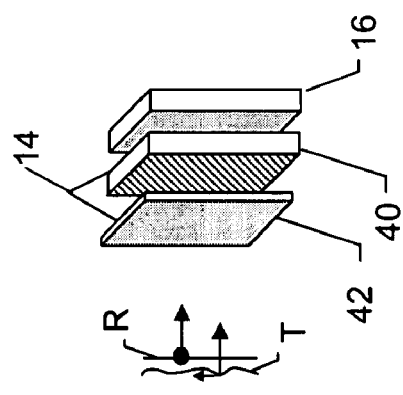
FIG. 4B is a schematic perspective view of another embodiment of the linear-carrier phase-mask of FIGS. 1-3 suitable for processing reference and test beams with orthogonal linear polarization.
Figure 4A:
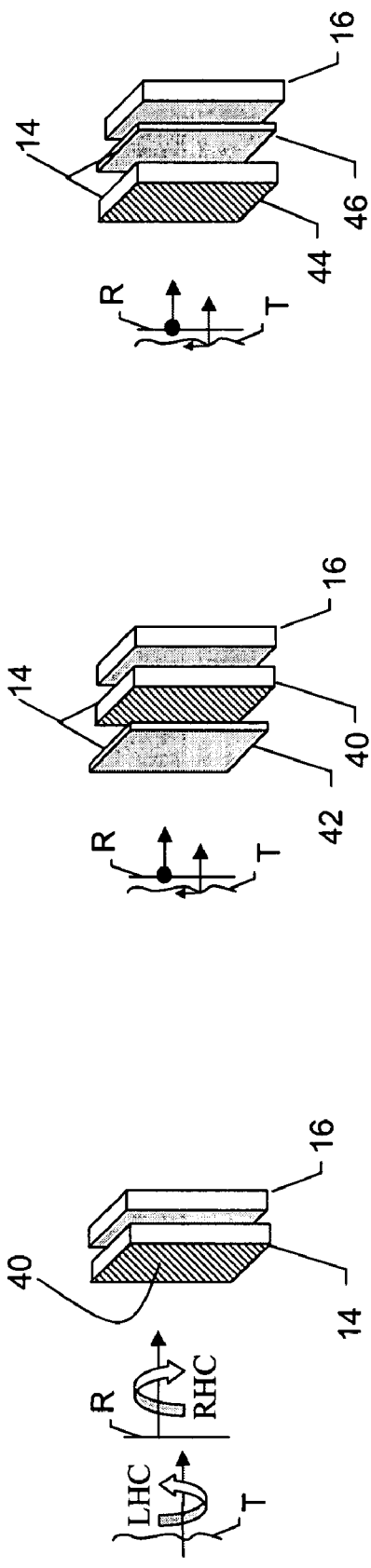
FIG. 4A is a schematic perspective view of the linear-carrier phase-mask shown in FIGS. 1-3 suitable for processing reference and test beams with orthogonal circular polarization.

An alternative embodiment of the LCPM 14, shown in FIG. 4C, consists of a birefringent phase plate 44 combined with a linear polarizer 46. The birefringent phase plate 44 could be constructed from a uniform birefringent substrate that is etched in depth so that each region has a discrete thickness of material that results in the desired phase-shift.

Figure 5:
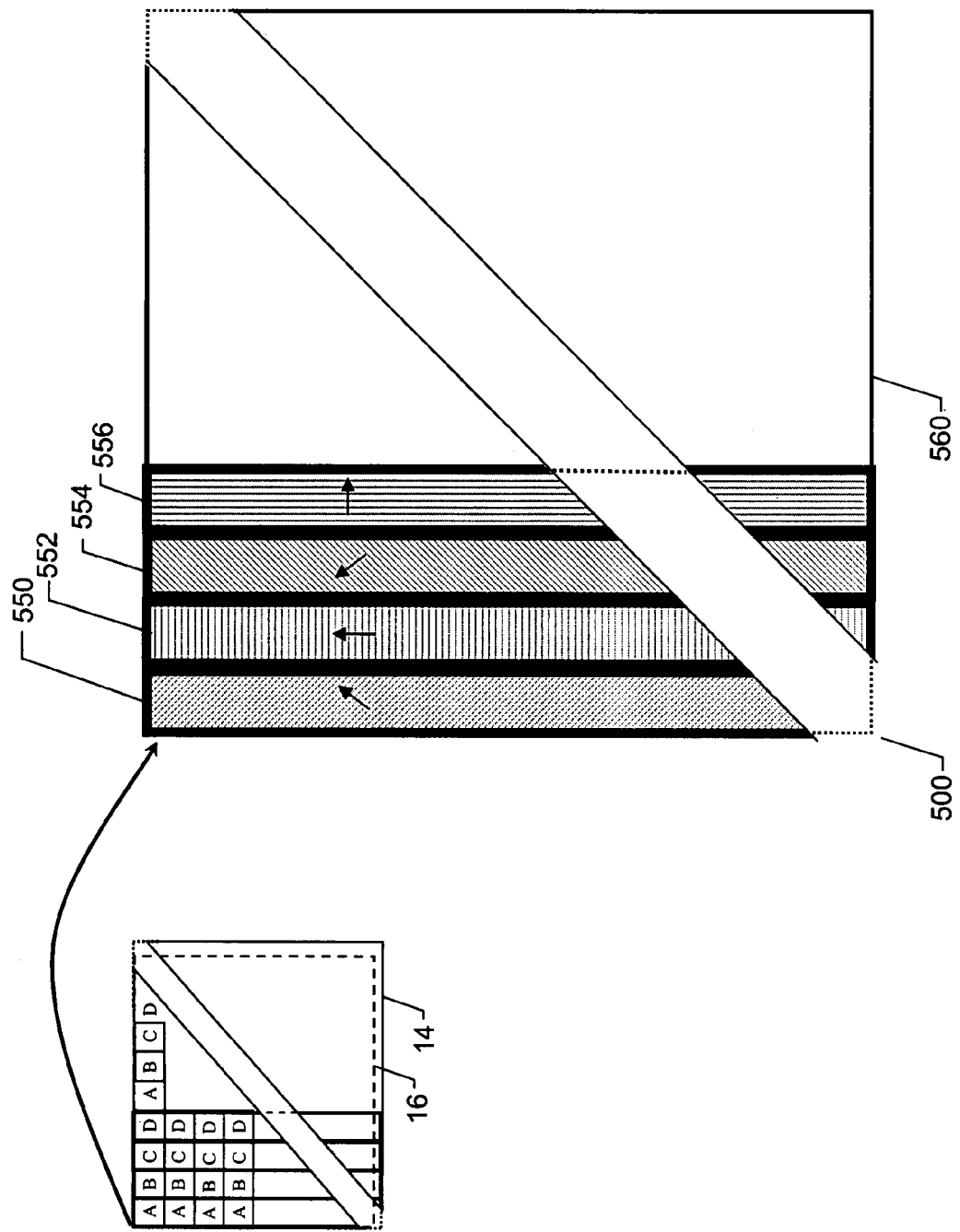
FIG. 5 is a schematic plan view of the linear-carrier phase-mask of FIGS. 1-4 illustrating one possible orientation for the polarization elements.

One embodiment for an LCPM 14 consisting of the oriented polarizer array 40 of FIG. 4A is illustrated in FIG. 5. A unit stripe 500 consists of four polarizer elements 550, 552, 554, and 556 over a substrate 560 oriented, respectively, at 0 degrees (550), 45 degrees (556), 90 degrees (552), and 135 degrees (554). The unit stripe 500 extends over one dimension of the phase-mask and is repeated across the entire LCPM 14 in the other dimension and covers the detector array 16. The capital letters A, B, C and D, shown in FIG. 5, represent different phase shifts and corresponding transfer functions at each pixel of the detector array 16 that result from the LCPM 14. The signal measured at each sensor pixel is given by its transfer function, the phase-difference between the reference and test beams, and the amplitude of each beam. For example, one possible configuration is, $$A(x, y) = \frac{1}{2}\left(I_r + I_s + 2\sqrt{I_r I_s} \cos(\Delta\phi(x, y))\right) \quad (2a)$$

$$B(x, y) = \frac{1}{2}\left(I_r + I_s + 2\sqrt{I_r I_s} \cos\left(\Delta\phi(x, y) + \frac{\pi}{2}\right)\right) \quad (2b)$$

$$C(x, y) = \frac{1}{2}\left(I_r + I_s + 2\sqrt{I_r I_s} \cos(\Delta\phi(x, y) + \pi)\right) \quad (2c)$$

$$D(x, y) = \frac{1}{2}\left(I_r + I_s + 2\sqrt{I_r I_s} \cos\left(\Delta\phi(x, y) + \frac{3\pi}{2}\right)\right) \quad (2d)$$

wherein $I_r(x,y)$ and $I_s(x,y)$ are the intensities of the reference and test wavefronts R and T at each x,y coordinate in the image, respectively, and $\Delta\phi(x,y)$ is the optical path difference between the reference and test wavefronts.

Multiple interferograms can thus be synthesized by combining pixels with like transfer functions. Referring to FIG. 5, the pixels with transfer functions equal to A can be combined into an interferogram that is a continuous fringe map that opticians are accustomed to viewing for alignment, which can be displayed on a screen in real-time. The B, C, and D pixels can be similarly combined to produce corresponding interferograms. The resulting interferograms have a total number of pixels equal to (n×m)/N, where n and m are the numbers of pixels in the detector array in the x and y directions, respectively, and N is the number of different discrete phase-shift elements in the linear-carrier phase mask 14. In the example of FIG. 5, N is equal to four. The resulting four interferograms can be processed by a variety of algorithms that are well-known in the art for calculating phase difference and modulation index.

For example, a possible implementation for measuring phase difference is a simple four-bucket algorithm, e.g., $$\Delta\phi(x,y)=\tan^{-1}\{[C(x,y)-A(x,y)]\div[D(x,y)-B(x,y)]\}, \quad (3)$$

where the values A, B, C, and D are taken from adjacent neighboring pixels. Similarly, a modulation index map can be generated (similar to the phase-difference map) using the formula $$\gamma(x,y) = \frac{2\sqrt{(A(x,y)-C(x,y))^2+(D(x,y)-B(x,y))^2}}{D(x,y)+B(x,y)+A(x,y)+C(x,y)}. \quad (4)$$

Figure 6:
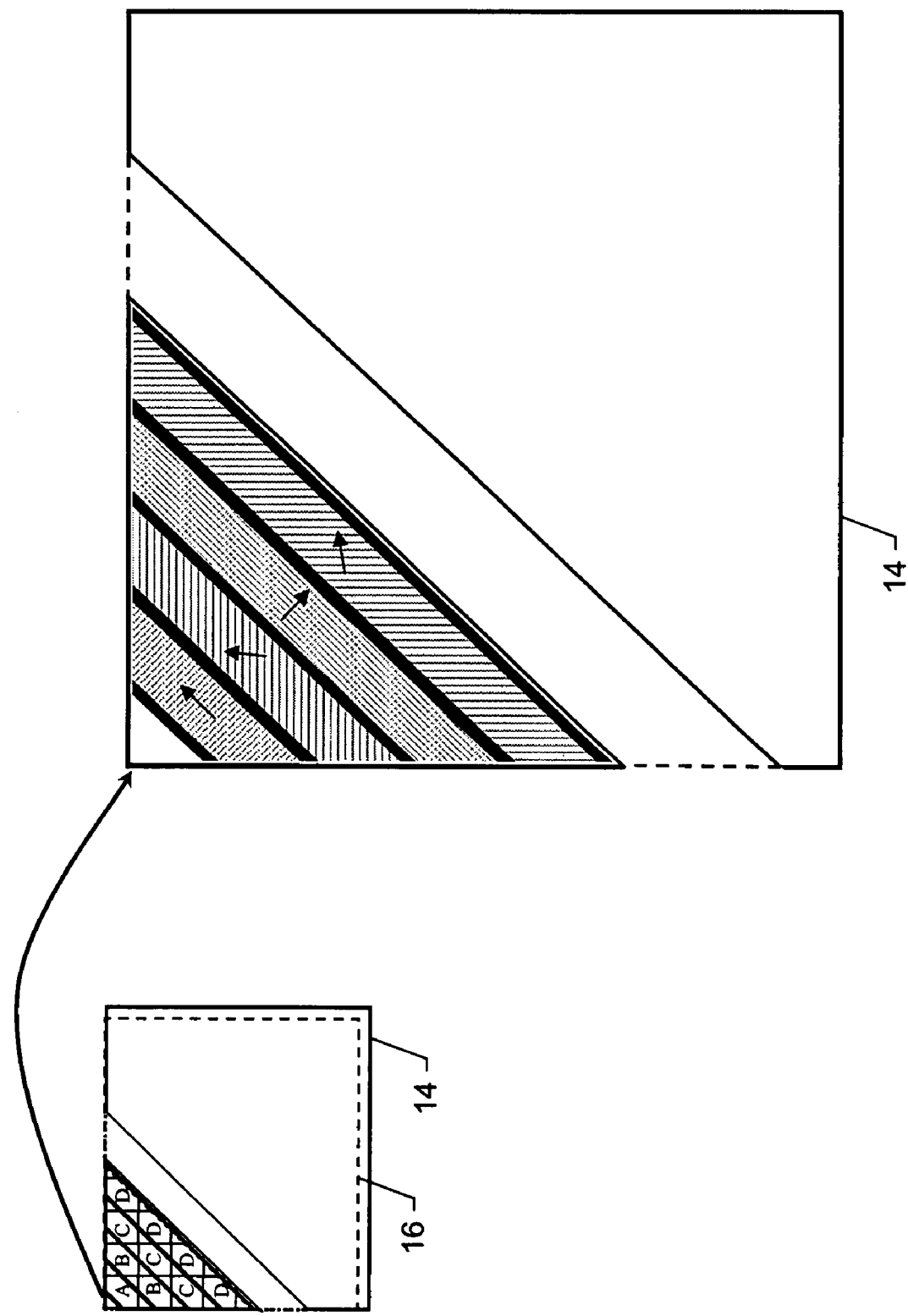
FIG. 6 is a schematic plan view of the linear-carrier phase-mask of FIGS. 1-4 illustrating another possible orientation for the polarization elements.

An alternative embodiment for arranging the LCPM 14 with respect to the detector array 16 is shown in FIG. 6. The LCPM 14 is oriented at an angle with respect to the detector pixel array 16. The method for calculating the phase difference at each spatial coordinate is to combine the measured signals of neighboring pixels in a fashion similar to a windowed convolution algorithm. This method provides an output phase-difference map having a total number of pixels equal to (n−W) times (m−V), where W and V are the sizes of the correlation window in the x and y directions, respectively.

Figure 7B:
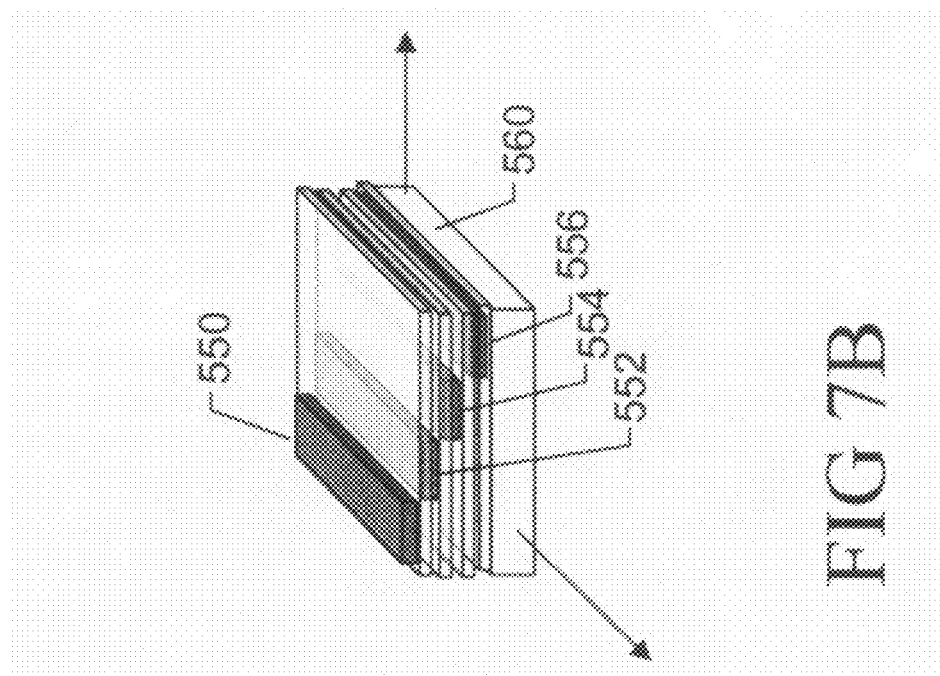
FIG. 7B is a perspective view of an alternative embodiment illustrating the use of multiple layers of polarization elements arranged on a substrate.
Figure 7A:
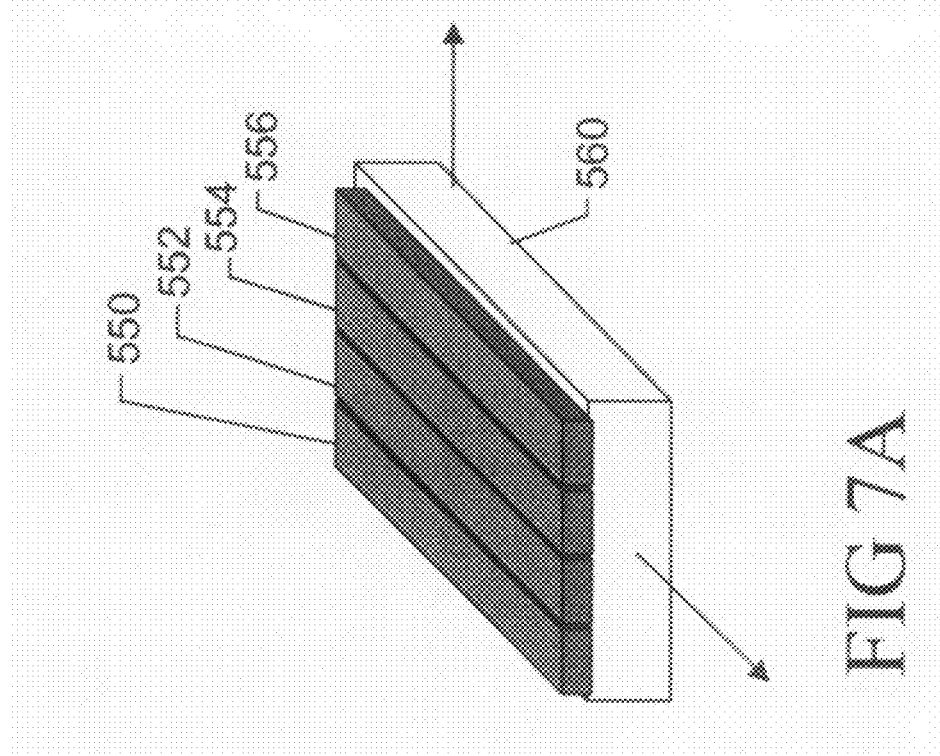
FIG. 7A is a perspective view of a linear-carrier phase-mask illustrating the use of a single layer of polarization elements arranged on a substrate.

The polarizer elements of the LCPM 14 can be constructed, for example, by the deposition of thin conducting wire grids oriented as shown in FIG. 5. The polarization elements could also be fabricated from oriented thin films, both in crystalline and amorphous form (for example, the polarizing solution sold by Sterling Optics, Inc., of Williamstown, Ky., under the trademark POLARCOAT). The polarizer elements may be disposed in a planar arrangement, as shown in FIG. 7A, or in a multi-layer arrangement, as seen in FIG. 7B, as long as the total thickness of the device is small compared to the lateral dimensions (less than ~¼ ratio).

Figure 8:
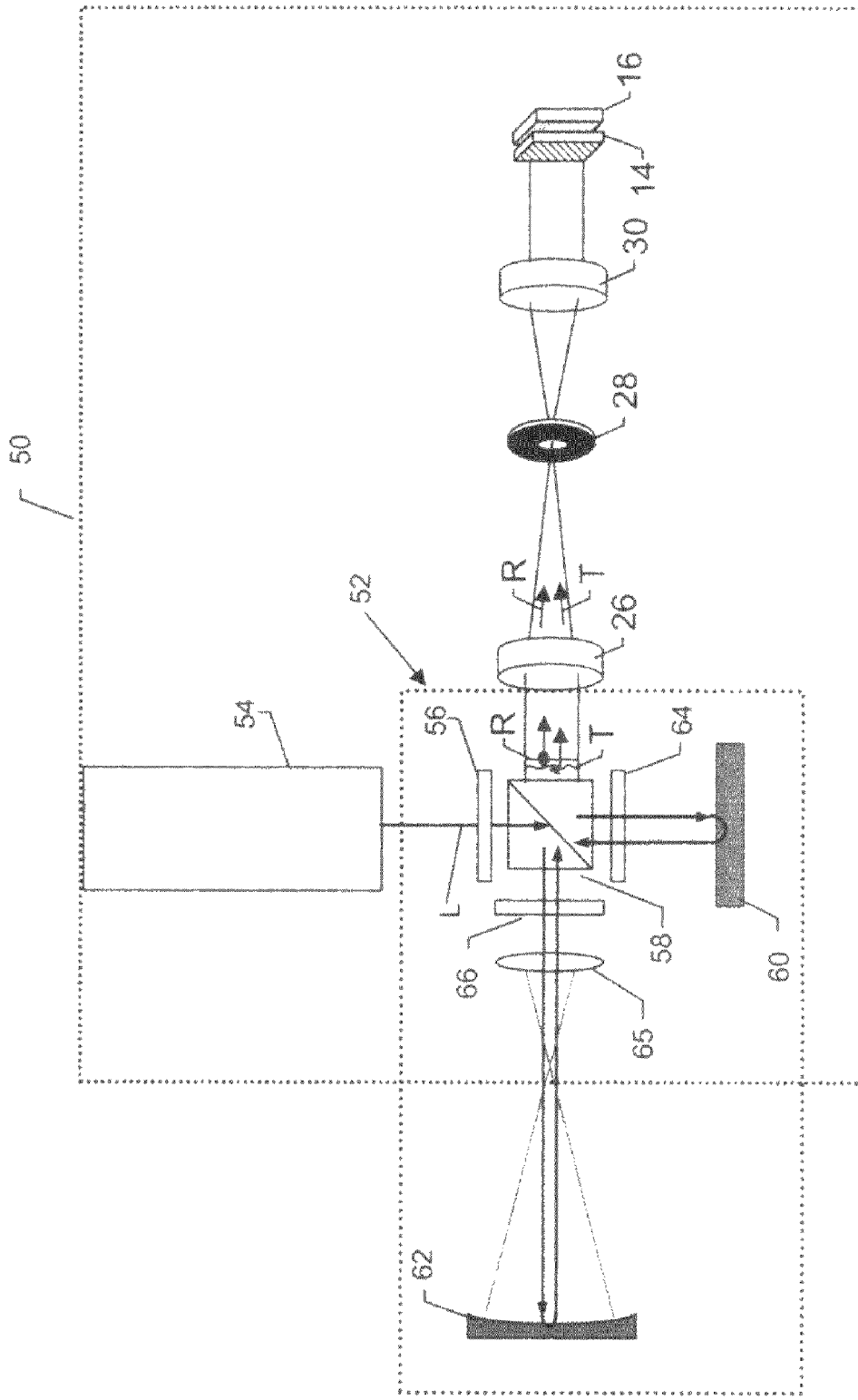
FIG. 8 is a schematic view of a system illustrating the linear-carrier phase-mask of the invention combined with a Twyman-Green polarization interferometer.

A complete measurement system 50 according to the invention is illustrated in FIG. 8, wherein the linear-carrier phase-mask 14 is used in conjunction with a conventional Twyman-Green interferometer 52. A linearly polarized beam L from a light source 54 is combined with a half-wave plate 56 to produce a linearly polarized beam of desired polarization angle directed to a polarizing beam splitter 58, which in turn generates a reference beam directed toward a reference surface 60 and a test beam directed toward a test surface 62 that are linearly polarized along orthogonal axes. Quarter-wave plates 64 and 66 are used to rotate the test and reference beams T and R after reflection while retaining their mutually orthogonal linear polarization states, so that they may be transmitted through and reflected from the beam splitter 58, respectively, toward the relay optics 26, 28 and 30. A coupling lens 65 is used in combination with test surface 62 to return a substantially collimated test beam T.

Figure 9:
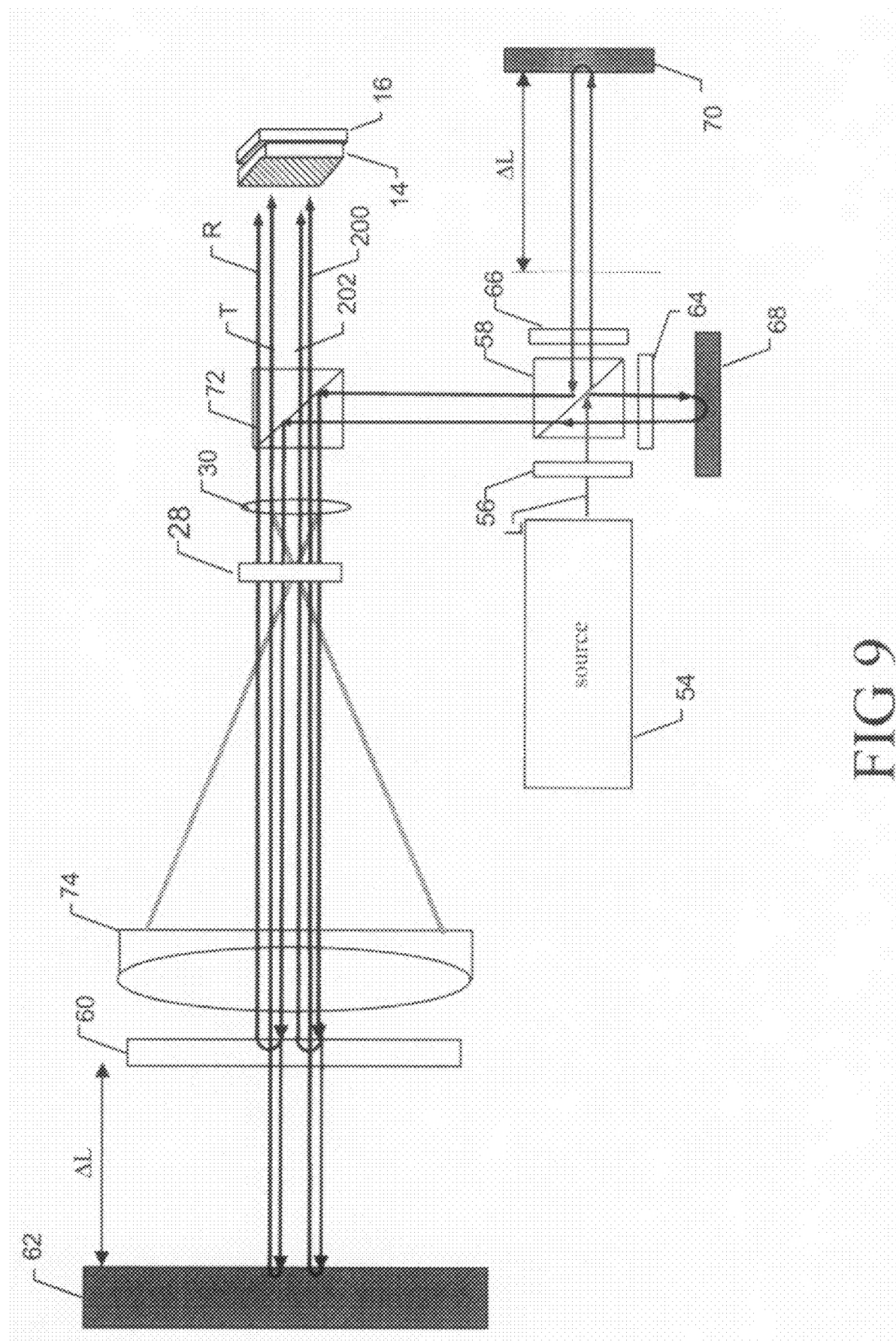
FIG. 9 is a schematic view of a system illustrating the linear-carrier phase-mask of the invention combined with a Fizeau polarization interferometer.

As one skilled in the art would readily understand, the linear-carrier phase-mask of the invention can similarly be combined in a plurality of other systems designed to carry out particular types of real-time measurement, such as with a Fizeau interferometer, a microscope profilometer, a wavefront sensor, and a strain sensor. For example, FIG. 9 shows an LCPM 14 and a detector 16 at the back end of a Fizeau interferometer. An optical delay line is used to generate two beams separated by an optical path delay $\Delta L$, as taught by Kuchel et al. in U.S. Pat. No. 4,872,755. The input beam L is directed by a beam splitter 58 toward two mirrors 68 and 70 along preferably orthogonal optical paths differing in length by the amount $\Delta L$. The two reflected beams are then redirected by the beam splitter 58 and injected into the Fizeau interferometer through another beam splitter 72, where they are both reflected from the reference surface 60 and the test surface 62. At the focal plane of the primary lens 74, the mutually orthogonal linearly polarized test and reference beams T,R are passed through an aperture 28, a collimating lens 30, and again through the beam splitter 72 toward the LCPM 14. The length of the delay line is adjusted to produce the same path delay as in the Fizeau cavity, so that the reference beam R and the test beam T are temporally coherent and yield high-contrast interference fringes in the spatial phase-shift interferometer constituted by the linear-carrier phase-mask 14. Thus, interference between extra reflections 202 and 200 as well as interference of spurious reflections from the imaging optics are suppressed.

It is noted that, as in the configuration of FIG. 8, the beams produced by the delay line need to be polarized to have orthogonal linear polarizations. To that end, the beam splitter 58 needs to be a polarizing beam splitter and additional polarizing elements, such as quarter-wave plates 64 and 66, are introduced in conventional manner in the optical paths of the two beams directed toward the mirrors 68 and 70, respectively, of the delay line to allow all of the light in the input beam L to be transmitted toward the Fizeau cavity.

Figure 10:
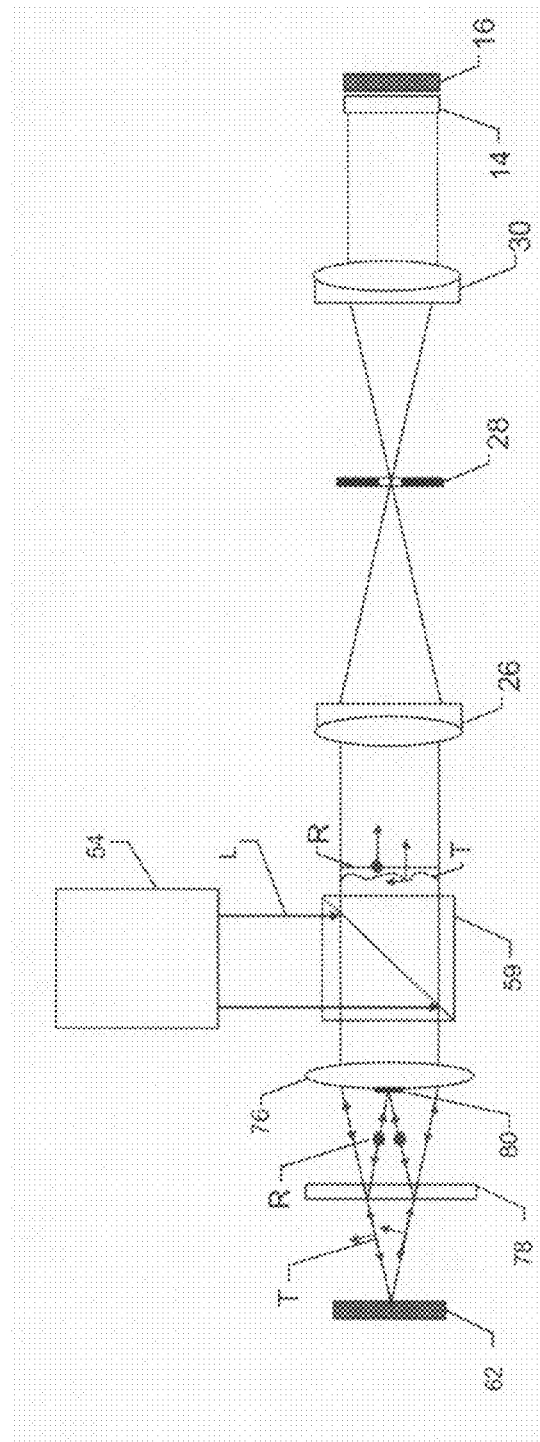
FIG. 10 is a schematic view of a system illustrating the linear-carrier phase-mask of the invention combined with a Mireau-type polarization interferometer.

FIG. 10 illustrates a measurement system configured to perform profilometry using a modified Mireau-type interferometer. The profilometer is configured to perform on-axis illumination and viewing, which is useful for obtaining three-dimensional (3D) information of the sample object 62. Many industries utilize profilometry in research and development, quality control and manufacturing, including the semiconductor and medical industries. Such a system includes a light source 54 that transmits a light beam L characterized by a predetermined coherence length Lc. A non-polarizing beam splitter 59 directs the light to a microscope objective 76 that consists of a standard Mireau objective lens modified through the introduction of a polarization thin-film beam splitter 78 that reflects one polarization to form a reference beam R while transmitting the remaining portion to form the test beam T. Such a polarization thin-film beams splitter 78 can be constructed, for example, by depositing an array of fine conducting wires on a glass substrate. The reference beam R is reflected from a high quality reflective spot 80 (with surface flatness <λ/10) located within the objective (possibly coated on one of the lens elements) and is subsequently reflected from the polarization thin-film beamsplitter 78 a second time, re-collimated by the objective lens 78, and transmitted to the LCPM interferometer 14. The test beam T is reflected from the target 62, transmitted through the polarization thin-film beam splitter 78, re-collimated by the objective lens 76, and transmitted to the LCPM interferometer. The test beam T and the reference beam R have orthogonal linear polarizations.

Figure 11:
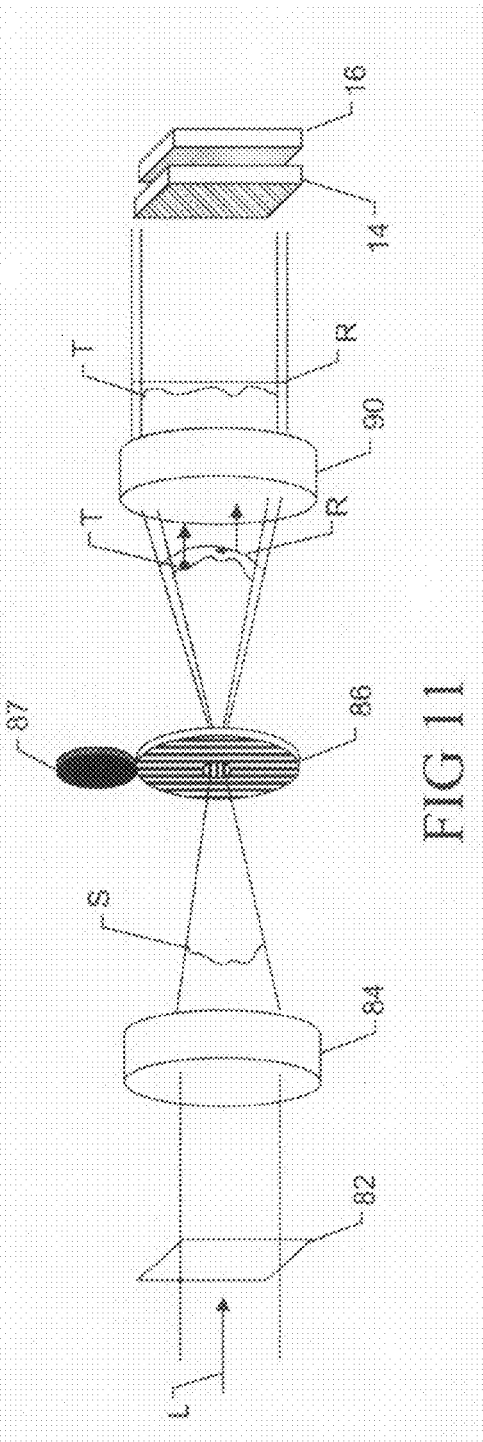
FIG. 11 is a schematic view of a system illustrating the linear-carrier phase-mask of the invention combined with a point-diffraction polarization interferometer.

FIG. 11 illustrates a measurement system according to the invention configured to function as a wavefront sensor. Wavefront sensors are used to measure, for example, pressure, temperature, or density gradients in transparent solids, liquids, and gases, as well as the quality of optical beams emitted from lasers. The embodiment of FIG. 11 is based on the use of a polarizing point-diffraction plate ("PDP") 86 according to a concept disclosed in U.S. Pat. No. 7,057,737, herein incorporated by reference. The input light L is received for testing through an entrance pupil 82 and a sample wavefront S is produced by an objective lens system 84 (which may consist of multiple elements) by focusing the light L onto the polarizing point diffraction plate 86. The light L may be narrow or broadband. The PDP is typically positioned perpendicular to the direction of light propagation and is used to produce two mutually orthogonal, polarized output wavefronts that propagate along a common path. The first wavefront T (the test wavefront) is a copy of the sample wavefront S. The second wavefront R is a spherical beam used as a reference wavefront because of its orthogonal polarization with respect to the test wavefront. A mechanism 87 may be coupled to the PDP 86 to enable its rotation about the optical axis and, if the input polarization is linear, change the power ratio of the reference and test beams. A lens system 90 collimates both the test and reference wavefronts T,R and delivers them to the linear-carrier phase-mask 14 of the invention for processing and analysis.

Figure 12:
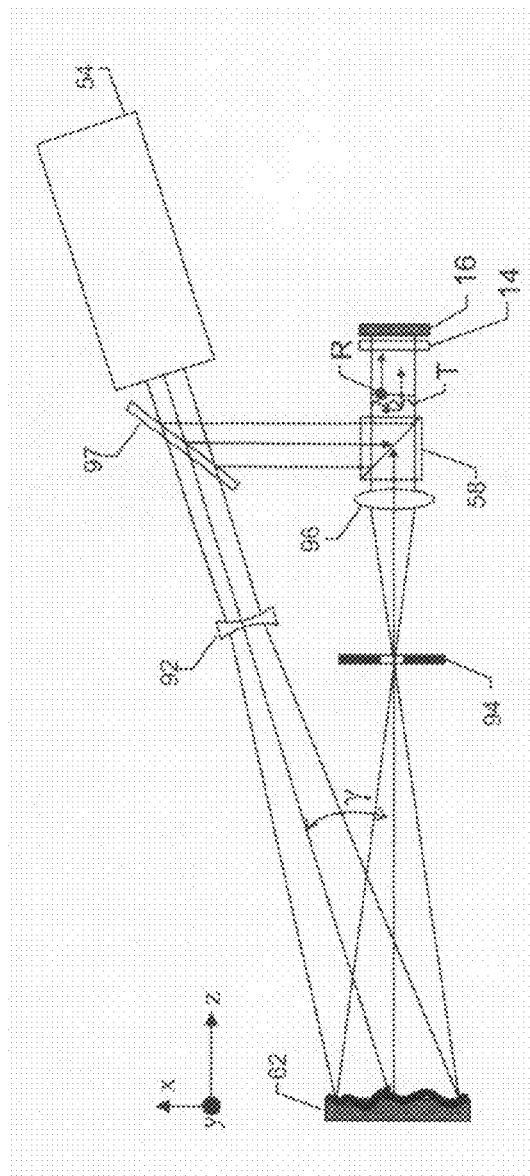
FIG. 12 is a schematic view of another exemplary embodiment of the invention, particularly illustrating an apparatus for measuring surface strain.

FIG. 12 illustrates another exemplary embodiment of a measurement system according to the invention configured to function as a strain sensor. Strain sensors are useful in measuring, for example, small deformations of an object due to acoustical, mechanical or thermal stress. The illumination unit 54 and a corresponding expansion lens 92 are adapted so that they may be positioned at an arbitrary angle γ relative to the normal (z axis) to the test object 62 and adjust the illumination to fill the area of interest. Imaging lens 96 is used to collect light scattered from the test object 62 and produce an image at the LCPM 14 and detector array 14. An aperture 94 is used to control the speckle size at the image. The reference beam R is generated using a beam pick-off 97 and combined with the test beam T at the polarizing beamsplitter 58. The strain sensor is primarily sensitive to motion or deformation of the test object 62 along the bisector of the angle γ. Thus, if γ is selected to be nearly equal to zero, the sensor is primarily sensitive to motion out of the plane of the sample object (i.e., along z).

Figure 13:
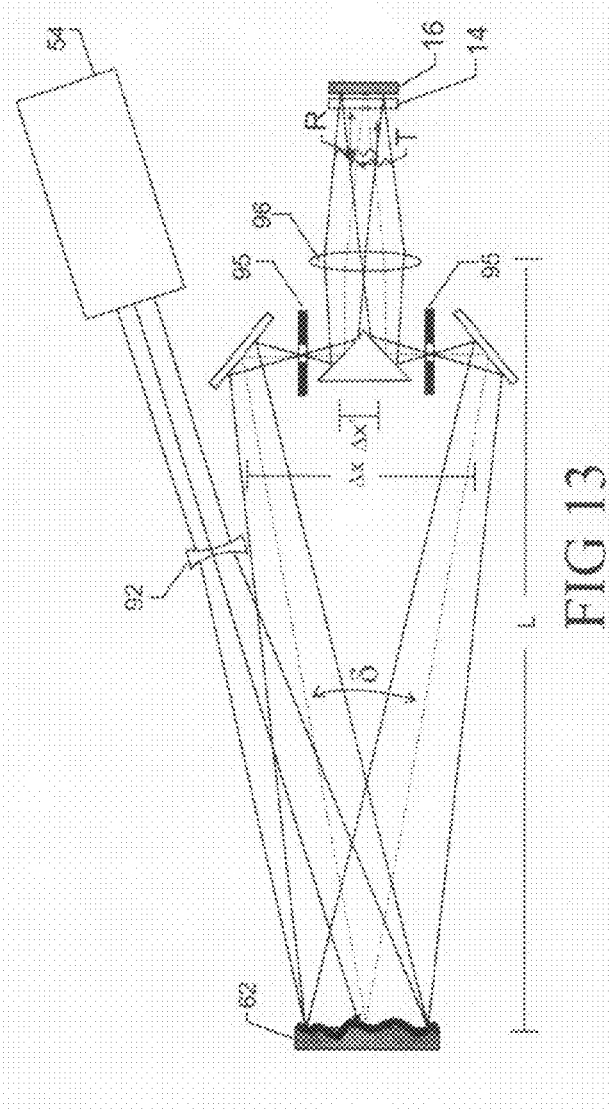
FIG. 13 is a schematic view of still another exemplary embodiment of the invention, particularly illustrating an apparatus for measuring surface strain in a shearing configuration.

FIG. 13 shows another embodiment of a measurement system configured to function as a shear-mode strain sensor. The illumination unit 54 and the expansion lens 92 may again be positioned at an arbitrary angle relative to the test object 62. Light is collected from two angles arranged symmetrically about the z-axis and defined by a full angle δ. The two collection channels incorporate two apertures and polarizers 95 that control the speckle size and polarize the light in orthogonal directions. An imaging lens 96 combines the light from each channel and focuses the image of the test object 62 on the LCPM 14 and detector array 16. The shear mode sensor is primarily sensitive to in-plane strains, e.g. along the x directions. The strain sensor embodiments shown in FIGS. 12 and 13 can be implemented using a single laser source and three sensors configured to measure all three strain components (Δx, Δy, Δz) simultaneously.

It is clear that suitable software applications may be utilized by the computer 22 (see FIG. 1) for data acquisition and processing for each of the foregoing embodiments of measuring systems according to the invention. The software application would preferably cause the computer 22 to acquire, process, analyze, and display data on the display 24. Data acquisition may be accomplished, for example, by recording a single interferogram. Wrapped phase maps are then calculated using algorithms such as Equation 3. The result is unwrapped to yield a map of the phase difference between the reference and object wavefronts. As is well understood in the art, "unwrapping" refers to the procedure used to remove the modulo $2\pi$ ambiguity that is characteristic of interferometric data.

For comparing two states of the system, such as necessary for the strain measurement or to subtract background phase noise from the system, the phase difference mode can be used. Phase may be calculated according to the well known relation:

$$\Delta\Phi(x, y) = \tan^{-1}[X(x, y) \div Y(x, y)], \qquad (5)$$

where:

$$X(x, y) = [D_0(x, y) - B_0(x, y)] * [A_1(x, y) - C_1(x, y)] -$$
$$[D_1(x, y) - B_1(x, y)] * [A_0(x, y) - C_0(x, y)],$$
$$Y(x, y) = [A_0(x, y) - C_0(x, y)] * [A_1(x, y) - C_1(x, y)] +$$
$$[D_0(x, y) - B_0(x, y)] * [D_1(x, y) - B_1(x, y)],$$

$A_0, B_0, C_0, D_0$ are the baseline images captured, and $A_1, B_1, C_1, D_1$ are the images captured for comparison.

The three dimensional shape of an object can be determined by using two-color interferometry. A single set of four phase-shifted interferograms is captured at wavelength $\lambda_0$ ($A_1$-$D_0$) and a second set of phase-shifted interferograms is captured at wavelength $\lambda_1$ ($A_1$-$D_1$). The relative distance to the object (or range) is calculated by $$R(x, y) = \frac{\lambda^2}{4\pi\Delta\lambda}\tan^{-1}\left(\frac{X(x, y)}{Y(x, y)}\right), \qquad (6)$$

where $\Delta\lambda = |\lambda_0 - \lambda_1|$. Noise in the image can be significantly reduced using a weighted spatial average over neighboring pixels. This can be accomplished by:

$$R(x, y) = \frac{\lambda^2}{4\pi\Delta\lambda}\tan^{-1}\left(\frac{\sum_{x,y \in \delta} X(x, y)}{\sum_{x,y \in \delta} Y(x, y)}\right), \qquad (7)$$

where the sums are performed over the range of δ nearest neighbors.

Because of the modulo $2\pi$ behavior of the arctangent function, the range is wrapped (ambiguous) beyond the so-called synthetic wavelength $$\lambda_s = \frac{\lambda^2}{4\pi\Delta\lambda}. \qquad (8)$$

Therefore, the well-known process of spatial phase unwrapping can be used to remove the discontinuous steps and perform quantitative analysis of the images. Alternatively, it is possible to use multiple synthetic wavelengths and incrementally add the range distance. [See J. M. Huntley and H. O. Saldner, "Profilometry Using Temporal Phase Unwrapping and a Spatial Light Modulator-Based Fringe Projector," *Opt. Eng.* 36, pp. 610-615 (1997).] The overall range is then given by:

$$R'(x, y) = \sum_m \frac{R_{\Delta\lambda m}(x, y)}{m}, \quad (9)$$

where m is the number of wavelength steps used and $R_{\lambda\Delta m}$ is the range measured with a frequency tuning of $\Delta\lambda/m$. Implied in this method is that no single measurement should have a phase value greater than $2\pi$, which can place a restriction on the maximum size of the object that can be measured.

Figure 14:
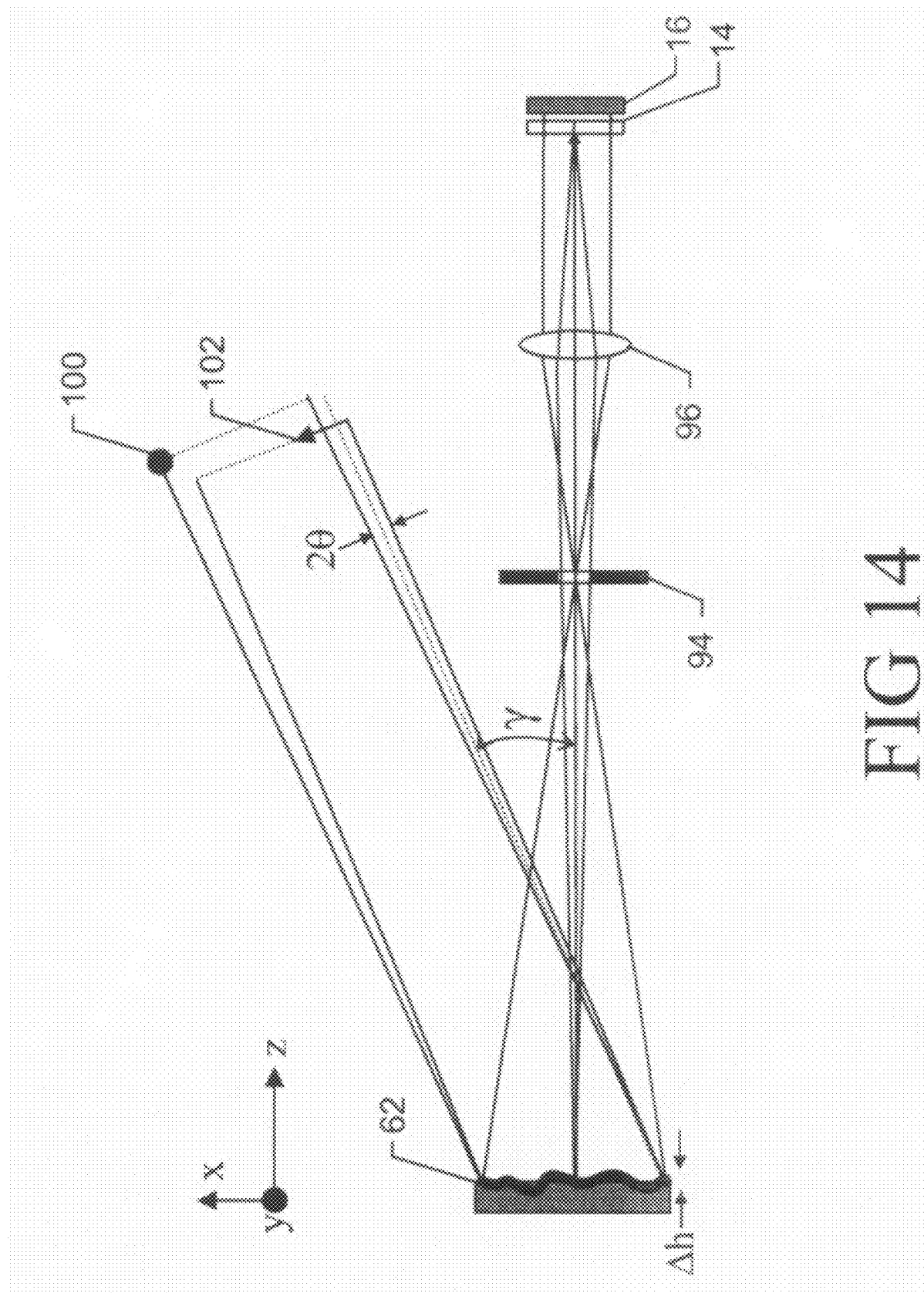
FIG. 14 is a schematic view of an embodiment of the invention wherein orthogonally polarized beams are used in a fringe-projection system.

Finally, FIG. 14 illustrates another embodiment of a measurement system according to the invention configured to function as a surface profilometer based on a fringe projection system. A test object 62 is illuminated by a first beam 100 and a second beam 102 that are orthogonally polarized with respect to each other. The beams are adjusted to illuminate the test object 62 at respective angles of incidence differing by a predetermined angle $2\theta$. The beams 100,102 can be generated from a laser or a broadband white-light source and the angle of incidence $\gamma$ of the bisector of the two illumination beams may be selected arbitrarily. An imaging system with an imaging lens 96 is used to collect light scattered from the test object 62 and produce an image at the LCPM 14 and detector array 14. An aperture 94 is preferably used to control the speckle size at the image.

The first and second illumination beams 100,102 do not interfere at the test surface 62, due to their mutually orthogonal polarizations, but they do interfere at the LCPM and produce a set of sinusoidal intensity fringes extending across the test surface 63 in the x direction. The nominal grating period $\Lambda$ in the x direction is given by $$\Lambda = \frac{\lambda}{\sin\theta}\cos\gamma, \quad (10)$$

where $\lambda$ is the nominal wavelength of the light. Ignoring the high-frequency speckles, the intensity fringes can be written as $$I(x, y) \propto \cos\left(\frac{2\pi}{\Lambda}(x + \Delta h \sin\gamma) + 2\alpha_p\right). \quad (11)$$

Thus, by measuring the phase distribution of the received pattern and removing the tilt component (the linear carrier in x), the deviations in surface height $\Delta h$ can be determined. By modifying the grating period $\Lambda$ and the angle of projection $\gamma$, the range and sensitivity of the measurement can be adjusted for particular applications.

FIG. 15 shows a preferred method of illumination for the fringe projection system of FIG. 14. A broadband or white-light source 105 is used to illuminate a grating 110. The diffracted orders of the grating are received by a lens 112 and focused on a polarization filter 114. The polarization filter blocks the zero order light and filters each of the first order beams with orthogonal polarizers (linear or circular). Other combinations of filtered orders are possible. The beams are then re-collimated by lens 116 and produce the first and second illumination beams 100,102 at the predetermined angle $2\theta$. This illumination scheme provides much less coherent noise or speckle. The technique is similar to phase-stepped fringe projection, which is well known in the art, but has the advantage of accomplishing single-frame measurements.

It is understood that the fringe projection system of FIGS. 14 and 15 could be implemented as well using a pixelated mask, as described in Ser. No. 10/838,694, instead of the linear-carrier masks disclosed herein. FIGS. 16A, 16B and 16C illustrate three embodiment of such a pixelated phase mask 14'. In the embodiment of FIG. 16A, the input polarization of the incoming beams is left-hand and right-hand circular, respectively. Accordingly, the pixelated phase mask is constructed from an array 40' of oriented polarizers. If the input polarization is linear, a quarter waveplate 42', oriented with the fast axis at 45 degrees with respect to the reference wavefront polarization axis, can be used to convert the wavefronts to opposite circular polarizations, as illustrated in FIG. 16B. Alternatively, a birefringent phase plate 44' may be combined with a linear polarizer 46', as seen in FIG. 16C.

Those skilled in the art will understand that the preceding exemplary embodiments of the invention provide the foundation for numerous alternatives and modifications that are also deemed within the scope of the invention. For example, where the invention has been described using linearly polarized test and reference beams directed to the linear-carrier phase-mask, it is clear that circularly polarized beams would work as well in all of the disclosed systems so long as orthogonally polarized. Similarly, the drawings illustrate phase-masks with straight linear strips of elements belonging to each phase-shift region, but curvilinear strips could also be used to implement the invention, subject of course to the manufacture and alignment complications that such implementations would produce. Therefore, while the invention has been shown and described herein in what is believed to be the most practical and preferred embodiments, it is recognized that departures can be made therefrom and the invention is not to be limited to the disclosed details but is to be accorded the full scope of the claims to embrace any and all equivalent apparatus and methods.

We claim:

1. A spatial phase-shifting interferometer comprising:
  a linear-carrier phase-mask adapted to receive a combined beam from orthogonally polarized test and reference beams, said phase-mask including a plurality of linear sets of phase-mask elements, each set being adapted to produce a predetermined phase shift between the test and reference beams, wherein said combined beam impinges in undivided form upon each of said sets of phase-mask elements along a single optical axis;
  a light detector in optical alignment with the phase-mask, each of said plurality of sets of phase-mask elements being aligned with a corresponding set of detector pixels; and
  means for performing an interferometric measurement based on said predetermined phase shift between the test and reference beams.

2. The interferometer of claim 1, wherein said reference and test beams are circularly polarized and said phase-mask elements comprise oriented polarizers.

3. The interferometer of claim 2, wherein said oriented polarizers are constructed with conductive wire grids arranged on a substrate.

4. The interferometer of claim 2, wherein said oriented polarizers are constructed with thin films arranged on a substrate.

5. The interferometer of claim 1, wherein said reference and test beams are linearly polarized and said phase-mask elements comprise quarter-wave retarders in combination with oriented polarizers.

6. The interferometer of claim 1, wherein said reference and test beams are linearly polarized and said phase-mask elements comprise birefringent phase-plate elements combined with linear polarizers.

7. The interferometer of claim 1, wherein said plurality of sets of phase-mask elements includes four sets and each set contains phase-mask elements uniformly distributed through the phase-mask.

8. The interferometer of claim 1, wherein said means for performing an interferometric measurement based on said predetermined phase shift between the test and reference beams includes means for digitizing signals detected at said detector pixels and means for processing digitized signal produced thereby.

9. The interferometer of claim 1, further comprising means for displaying interferograms generated by the interferometer.

10. The interferometer of claim 1, wherein said plurality of linear sets of phase-mask elements includes four sets and each set contains phase-mask elements uniformly distributed through the phase-mask; and said means for performing an interferometric measurement includes means for digitizing signals detected at said detector pixels, means for processing digitized signal produced thereby, and means for displaying interferograms generated by the interferometer.

11. The interferometer of claim 1, wherein said linear-carrier phase-mask and said light detector are placed substantially at a same image plane.

12. The interferometer of claim 11, further including relaying optics to form an image of an input pupil plane at a location substantially coincident with the linear-carrier phase-mask.

13. The interferometer of claim 12, further including an aperture within said relay optics, said aperture being selected so that a diffraction-limited spot received at the linear-carrier phase-mask is approximately equal to two phase-mask elements in diameter.

14. The interferometer of FIG. 1, wherein said linear-carrier phase-mask and said light detector are placed substantially at conjugate image planes.

15. The interferometer of claim 14, further including relay optics between said conjugate image planes, said relay optics including a magnification lens to enlarge an effective size of the detector pixels.

16. An interferometric measurement system comprising:
a polarization interferometer in Twyman-Green configuration producing orthogonally polarized test and reference beams;
a linear-carrier phase-mask adapted to receive said orthogonally polarized test and reference beams as a combined beam, said phase-mask including a plurality of linear sets of phase-mask elements, each set being adapted to produce a predetermined phase shift between the test and reference beams, wherein said combined beam impinges in undivided form upon each of said sets of phase-mask elements along a single optical axis;
a light detector in optical alignment with the phase-mask, each of said plurality of sets of phase-mask elements being aligned with a corresponding set of detector pixels; and
means for performing an interferometric measurement based on said predetermined phase shift between the test and reference beams.

17. An interferometric measurement system comprising:
a polarization interferometer in Fizeau configuration producing orthogonally polarized test and reference beams;
a linear-carrier phase-mask adapted to receive said orthogonally polarized test and reference beams as combined beam, said phase-mask including a plurality of linear sets of phase-mask elements, each set being adapted to produce a predetermined phase shift between the test and reference beams, wherein said combined beam impinges in undivided form upon each of said sets of phase-mask elements along a single optical axis;
a light detector in optical alignment with the phase-mask, each of said plurality of sets of phase-mask elements being aligned with a corresponding set of detector pixels; and
means for performing an interferometric measurement based on said predetermined phase shift between the test and reference beams.

18. An interferometric measurement system comprising:
a polarization interferometer in Mireau configuration producing orthogonally polarized test and reference beams;
a linear-carrier phase-mask adapted to receive said orthogonally polarized test and reference beams as a combined beam, said phase-mask including a plurality of linear sets of phase-mask elements, each set being adapted to produce a predetermined phase shift between the test and reference beams, wherein said combined beam impinges in undivided form upon each of said sets of phase-mask elements along a single optical axis;
a light detector in optical alignment with the phase-mask, each of said plurality of sets of phase-mask elements being aligned with a corresponding set of detector pixels; and
means for performing an interferometric measurement based on said predetermined phase shift between the test and reference beams.

19. An interferometric measurement system comprising:
a point-diffraction polarization interferometer producing orthogonally polarized test and reference beams;
a linear-carrier phase-mask adapted to receive said orthogonally polarized test and reference beams as a combined beam, said phase-mask including a plurality of linear sets of phase-mask elements, each set being adapted to produce a predetermined phase shift between the test and reference beams, wherein said combined beam impinges in undivided form upon each of said sets of phase-mask elements along a single optical axis;
a light detector in optical alignment with the phase-mask, each of said plurality of sets of phase-mask elements being aligned with a corresponding set of detector pixels; and
means for performing an interferometric measurement based on said predetermined phase shift between the test and reference beams.

20. An interferometric measurement system comprising:
a polarization interferometer producing orthogonally polarized test and reference beams;
a linear-carrier phase-mask adapted to receive said orthogonally polarized test and reference beams as a combined beam, said phase-mask including a plurality of linear sets of phase-mask elements, each set being adapted to produce a predetermined phase shift between the test and reference beams, wherein said combined beam impinges in undivided form upon each of said sets of phase-mask elements along a single optical axis;

a light detector in optical alignment with the phase-mask, each of said plurality of sets of phase-mask elements being aligned with a corresponding set of detector pixels; and means for performing an interferometric measurement based on said predetermined phase shift between the test and reference beams.

21. A fringe-projection interferometric measurement system comprising:

a light source producing two orthogonally polarized beams incident on a sample at respective angles of incidence that vary by a predetermined amount;

an imaging system collecting light from said two orthogonally polarized beams scattered from the sample;

a phase-mask adapted to receive said light from the two orthogonally polarized beams as a combined beam and produce a predetermined phase shift between the orthogonally polarized beams, wherein said combined beam impinges in undivided form upon a plurality of sets of phase-mask elements along a single optical axis;

a light detector in optical alignment with the phase-mask, each of said plurality of sets of phase-mask elements being aligned with a corresponding set of detector pixels; and means for performing an interferometric measurement based on said predetermined phase shift between the orthogonally polarized beams.

22. The system of claim 21, wherein said phase mask is a linear-carrier phase-mask including a plurality of linear sets of phase-mask elements, each set being adapted to produce a predetermined phase shift between said orthogonally polarized beams, wherein said combined beam impinges in undivided form upon each of said sets of phase-mask elements along a single optical axis.

23. The system of claim 21, wherein said phase mask is a pixelated phase-mask including a plurality of sets of phase-mask pixels, each set being adapted to produce a predetermined phase shift between said orthogonally polarized beams, wherein said combined beam impinges in undivided form upon each of said sets of phase-mask elements along a single optical axis.

24. The system of claim 21, wherein the light source comprises a grating, a first lens, a polarization filter, and a second grading in optical alignment, such that light illuminating the grating produces diffracted orders of said light that are received by the first lens and focused on the polarization filter, whereby zero order light is blocked and first order light is filtered to produce said two orthogonally polarized beams.

25. A method for spatially phase-shifting two orthogonally polarized test and reference beams for an interferometric measurement comprising the following steps:

providing a linear-carrier phase-mask including a plurality of linear sets of phase-mask elements, each set being adapted to produce a predetermined phase shift between the test and reference beams;

illuminating the phase-mask with the test and reference beams impinging in undivided form upon each of said sets of phase-mask elements along a single optical axis;

capturing said test and reference beams after processing through the phase-mask with a light detector in optical alignment with the phase-mask, each of said plurality of sets of phase-mask elements being aligned with a corresponding set of detector pixels;

performing an interferometric measurement based on said predetermined phase shift between the test and reference beams; and fixing a result of said interferometric measurement to a tangible medium to provide a vehicle for an analysis of the interferometric measurement.

26. The method of claim 25, wherein said reference and test beams are circularly polarized and said phase-mask elements comprise oriented polarizers.

27. The method of claim 26, wherein said reference and test beams are linearly polarized and said phase-mask elements comprise a quarter-wave retarder in combination with an oriented polarizer.

28. The method of claim 25, wherein said reference and test beams are linearly polarized and said phase-mask elements comprise a birefringent phase plate combined with a linear polarizer.

29. The method of claim 25, wherein said plurality of sets of phase-mask elements includes four sets and each set contains phase-mask elements uniformly distributed through the phase-mask.

30. The method of claim 25, wherein said linear-carrier phase-mask and said light detector are placed substantially at a same image plane.

31. The method of claim 25, wherein said linear-carrier phase-mask and said light detector are placed substantially at conjugate image planes.

* * * * *